July 24, 1923.

J. F. WEBER

SOD CUTTING PLOW

Filed Sept. 25, 1922

1,463,106

2 Sheets-Sheet 1

Inventor,
J. F. Weber
By [Attorneys]

July 24, 1923.　　　　　　　　　　　　　　　　　1,463,106
J. F. WEBER
SOD CUTTING PLOW
Filed Sept. 25, 1922　　　2 Sheets-Sheet 2

Inventor,
J. F. Weber
By C. A. Snow & Co.
Attorneys.

Patented July 24, 1923.

1,463,106

UNITED STATES PATENT OFFICE.

JOSEPH F. WEBER, OF LANSING, MICHIGAN.

SOD-CUTTING PLOW.

Application filed September 25, 1922. Serial No. 590,464.

*To all whom it may concern:*

Be it known that I, JOSEPH F. WEBER, a citizen of the United States, residing at Lansing, in the county of Ingham and State of Michigan, have invented a new and useful Sod-Cutting Plow, of which the following is a specification.

The device forming the subject matter of this application is adapted to be used for cutting sod, and the invention aims to provide novel means whereby the sod may either be permitted to lie on the ground, or to be removed, at the will of an operator. Another object of the invention is to provide novel means whereby the cutters which pass beneath the sod may be adjusted. A further object of the invention is to provide novel means whereby the rotary elements which cut the sod will be prevented from becoming clogged.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
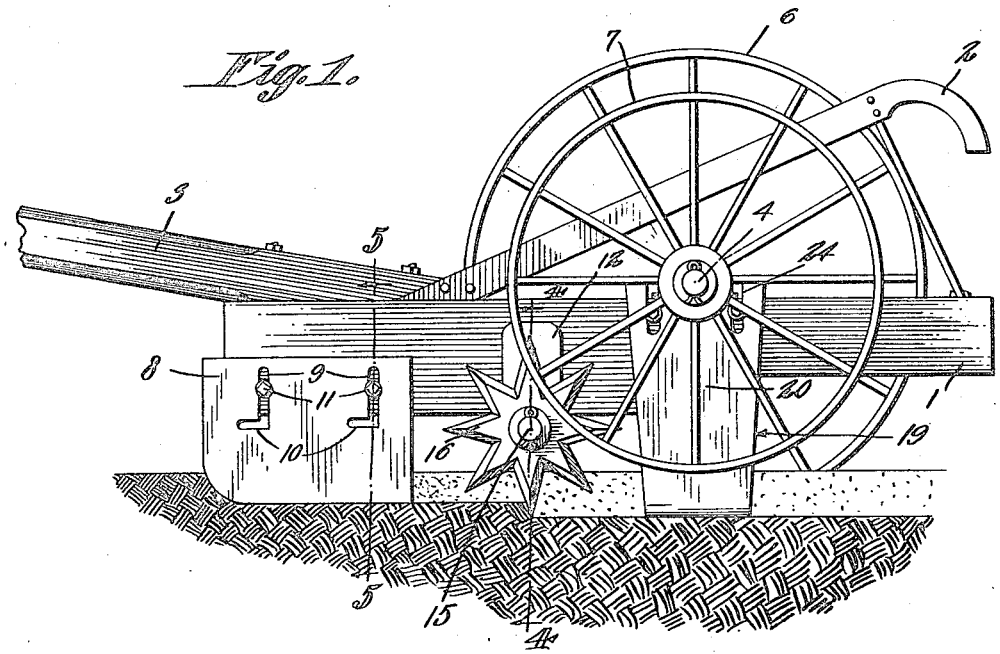
Figure 3:
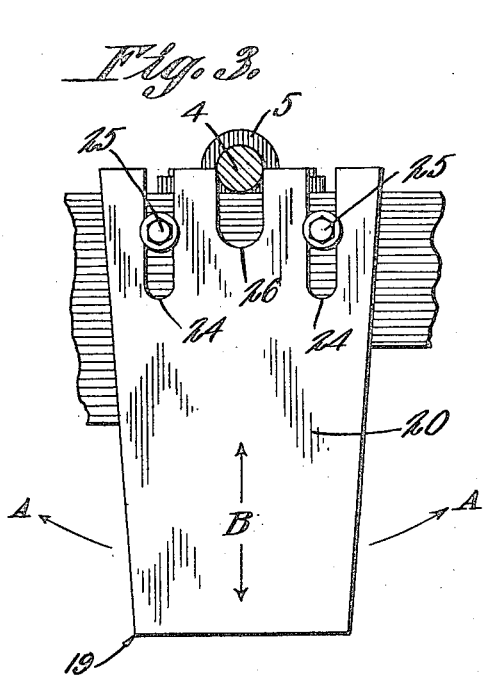
Figure 2:
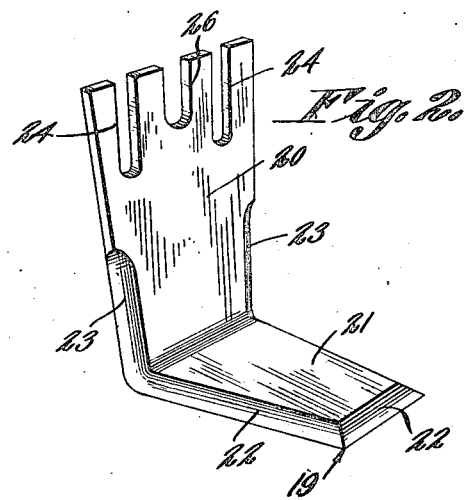
Figure 4:
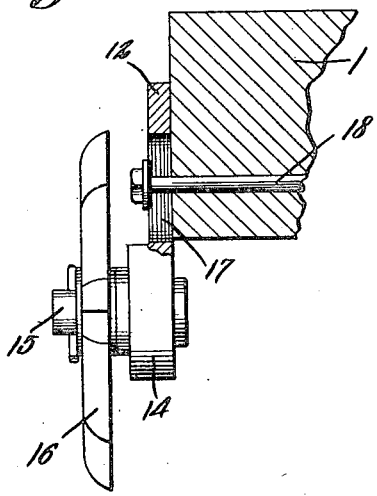
Figure 5:
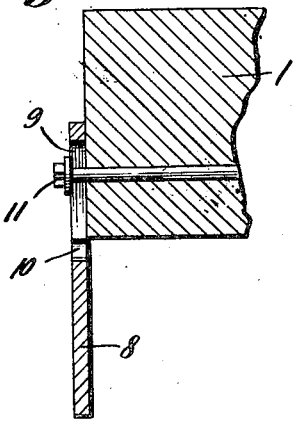
Figure 6:
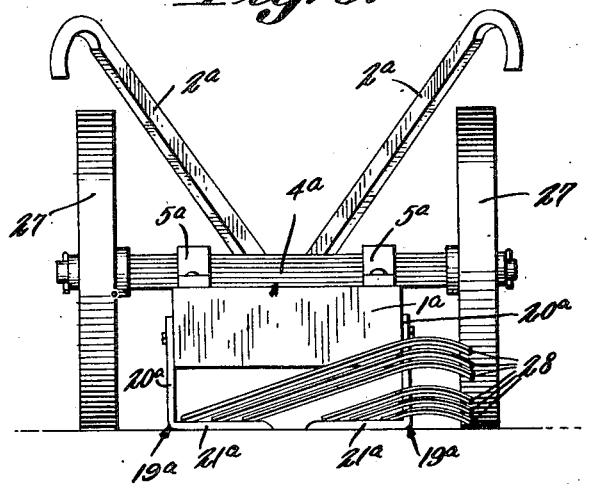

Figure 1 shows in side elevation, a device constructed in accordance with the invention; Figure 2 is a perspective view showing one of the rear cutters; Figure 3 is a sectional detail showing the means whereby the cutter shown in Figure 2 is mounted on the frame; Figure 4 is a section on the line 4—4 of Figure 1; Figure 5 is a section on the line 5—5 of Figure 1; Figure 6 is a rear elevation showing a modification.

The device includes a frame or base 1 carrying handles 2 and a draft means 3. An axle 4 is held by securing elements 5 on the frame 1, wheels 6 and 7 being journaled on the axle, the wheel 6 being of greater diameter than the wheel 7. The wheel 7 rolls on the surface of the sod, whereas the wheel 6 rolls on the ground from which the sod has been removed. Guides or forward cutters 8 lie against the sides of the frame 1 and have vertical slots 9 provided with horizontal extensions 10. Securing elements 11, such as bolts, are mounted in the frame 1 and are located in the slots 9 of the cutters 8. Brackets 12 abut against the sides of the frame 1 and are provided at their lower ends with bearings 14 carrying stub axles 15 whereon intermediate rotary cutters 16 are journaled, the said cutters being in the form of star wheels, if desired. The brackets 12 have vertically elongated slots 17 receiving securing elements 18, such as bolts, mounted in the frame 1. Rear cutters 19 are provided, each cutter 19 comprising a body 20 and a foot 21 disposed at an angle to the body, the feet 21 extending inwardly toward each other. The foot 21 has cutting edges 22 which are extended at 23 upon the body 20. The body 20 of the cutter 19 lies against the sides of the frame 1 and is provided with vertical slots or openings 24 adapted to receive securing elements 25 mounted in the frame 1. The body 20 of each cutter has a slot or opening 26 which receives the axle 4 closely, the slots 24 being large enough so that the body 20 may be shifted slightly for adjustment on the securing elements 25.

The guides 8 cut the sod partially and prevent the rotary cutters 16 from being clogged. If desired, the members 8 may be raised, the securing elements 11 being received in the extensions 10 of the slots 9, whereupon the said members 8 will be disposed in an inoperative position. The rotary cutters 16 may operate below the members 8, as shown in Figure 1, and complete the cut along the edges of the strip of sod. The feet 21 of the cutters 19 pass beneath the strip of sod and make the horizontal cut which severs the sod from the earth. The axle 4 is received in the slots 26 of the bodies 20 of the cutters 19 and takes most of the strain off the bolts 25. The cutters 19 may be adjusted by a swinging movement, in the direction of the arrows A in Figure 3, and they may be adjusted vertically in the direction of the arrows B.

In Figure 6, parts hereinbefore described have been designated by numerals previously used with the suffix "a." This form of the invention is used when it is desired to peel the sod off the soil and carry the sod laterally, the parts 21ª of the cutters 19ª being supplied with laterally extended fingers 28 located in a plane which slants downwardly and forwardly, ground wheels 27 being provided, the ground wheels, preferably being of the same diameter.

I claim:—

1. A device of the class described comprising a wheel mounted frame; guides; means for mounting the guides on the frame for vertical adjustment; rotary cutters journaled on the frame and located to the rear of the guides; and angular undercutters carried by the frame and disposed to the rear of the rotary cutters.

2. A device of the class described comprising a frame; guides having slots including vertical and horizontal portions; securing elements on the frame and disposed in the vertical portions of the slots, the securing elements being adapted to be received in the horizontal portions of the slots, to hold the guides in elevated position; rotary cutters mounted on the frame and located to the rear of the guides; and angular undercutters on the frame and disposed to the rear of the rotary cutters.

3. In a device of the class described, a frame; an axle on the frame; an undercutter mounted to swing for adjustment on the axle; and a securing element mounted in the frame, the undercutter having an opening receiving the securing element and of sufficient size to permit the undercutter to be swung for adjustment on the axle; and ground wheels carried by the axle.

4. In a device of the class described, a frame; an axle on the frame; ground wheels carried by the axle; a securing element mounted on the frame; and a cutter having elongated openings receiving the axle and the securing element, said openings permitting a vertical adjustment of the cutter, one of said openings being of such a size as to afford a pivotal mounting for the cutter on the axle, and the other of the openings being of sufficient size to permit a movement of the cutter on the securing elements.

In testimony that I claim the foregoing as my own, I have hereto affixed my signature in the presence of two witnesses.

JOSEPH F. WEBER.

Witnesses:
Mrs. E. J. HOELZLE,
F. PAUL RICHTER.